UNITED STATES PATENT OFFICE 2,615,918

PREPARATION OF ACRYLAMIDE

Walter A. Raczynski, Elkton, Md., assignor to Hercules Powder Company, Wilmington, Del., a corporation of Delaware No Drawing. Application December 29, 1951, Serial No. 264,259

5 Claims. (Cl. 260—561)

This invention relates to a process for preparing acrylamide and, more particularly, to a method of preparing acrylamide from acrylic anhydride and ammonia.

In the past acrylamide has been prepared by the reaction of the acid chloride, acrylyl chloride, or an acrylic ester with ammonia, or by the partial hydrolysis of acrylonitrile. In each case the yield of acrylamide which is realized is low and the processes are both laborious and uneconomical. Furthermore, the separation of the acrylamide in pure crystalline form has been difficult. Attempts to prepare acrylamide by the reaction of acrylic acid or acrylic anhydride with ammonia have previously resulted in the production of amino propionamide, amino bis(propionamide) and amino tris(propionamide) due to the addition of ammonia to the double bond of the acrylic acid molecule.

Now in accordance with this invention, it has been found that acrylamide may be prepared by treating acrylic anhydride with gaseous ammonia in the presence of an inert organic solvent at a temperature within the range of from about 0° C. to about 25° C. When carried out under these conditions, there is surprisingly enough, little or no addition of ammonia to the double bond of the acrylic acid molecule. Furthermore, the product is obtained in a high degree of purity and with a high yield.

The following examples will illustrate the process of this invention. All parts and percentages are by weight unless otherwise indicated.

Example 1

A solution of a crude acrylic anhydride containing 126 parts of acrylic anhydride and 20 parts of acrylic acid in 648 parts of ethylene dichloride was cooled to 10° C. and 38.8 parts (2.3 moles per mole of anhydride) of gaseous ammonia was vaporized into the mixture during 2.5 hours, the solution being thoroughly agitated during the addition and the temperature being maintained at 10–14° C. After the addition of the ammonia was complete, the reaction mixture was heated to 40° C., filtered, and the filter cake (ammonium acrylate) was then extracted 4 times with 500-part portions of hot ethylene dichloride. The extracts were combined, reduced to ⅕ the initial volume by distillation, and then were cooled to 10° C. The solid which separated was filtered and dried. It amounted to 54.1 parts and on analysis was found to contain 87.0% acrylamide and 7.22% ammonium acrylate. By vacuum-distilling the filtrate from the extracts to remove the solvent, 35.6 parts of a solid was obtained which on analysis was found to contain 41% of acrylamide, 10.2% ammonium acrylate, and 9.8% acrylic anhydride. The total conversion to acrylamide was, therefore, 86.9% and the yield was 89.4%.

Example 2

Ammonia (47.4 parts, which is equivalent to 2.1 moles per mole of anhydride) was vaporized into a solution of 162.5 parts of acrylic anhydride in 388.5 parts of ethylene dichloride during 4 hours, the temperature being held at 4°–10° C. during the addition. The reaction mixture was then heated to 40° C. and the ethylene dichloride solution was filtered and the filtrate was cooled. The white solid which separated was filtered and dried. It amounted to 30.6 parts and contained 85% acrylamide. By removal of the solvent from the filtrate, an additional portion of acrylamide was obtained. The ammonium acrylate filter cake was then extracted with ethylene dichloride at 60° C. and the filtrate cooled and processed as before whereby an additional amount of acrylamide was obtained. The total acrylamide so obtained was equivalent to a conversion of acrylic anhydride to acrylamide of 87.4% and a yield of 88.6%.

Example 3

A crude acrylic anhydride (32.5 parts) containing 21.5 parts of acrylic anhydride and 11 parts of acrylic acid was dissolved in 225 parts of anhydrous chloroform and the solution was cooled to 3°–5° C. Ammonia (7.88 parts, which amounted to 3 moles of ammonia per mole of anhydride) was then volatilized into the well-agitated solution during 40 minutes, the temperature being held at 3°–5° C. during the addition. The reaction mixture was then heated to 20° C. and filtered. The filtrate was then distilled at 40° C. under 20 mm. pressure to remove the chloroform whereby the acrylamide was obtained as a residue. The yield of acrylamide so obtained amounted to 89.4%.

Example 4

One hundred thirteen parts of a crude acrylic anhydride containing 86.6% acrylic anhydride and 5% acrylic acid was dissolved in 500 parts of ether. Ammonia (25.14 parts, which was equivalent to 2.1 moles per mole of anhydride) was volatilized into the well-agitated solution for 45 minutes, the temperature being held at 0°–8° C. during the addition. The reaction mixture was then filtered and the filtrate vacuum-distilled at 20 mm. pressure whereby the acrylamide was obtained as a residue. Extraction of the filter cake yielded an additional amount of acrylamide. The total yield of acrylamide so obtained amounted to 92.56%.

Example 5

Gaseous ammonia (25.5 parts) was passed into a solution of 62.3 parts of acrylic anhydride and 30.0 parts of acrylic acid in 300 parts of ethylene dichloride during 2.5 hours, the temperature being held at 7°–13° C. during the reaction. An additional 600 parts of ethylene dichloride was added in increments during the reaction to maintain a more fluid reaction media. After completion of the addition of ammonia, the reaction mixture was heated to 40° C., filtered and the filtrate then cooled. The white solid which separated was filtered and dried. The filtrate was vacuum concentrated to ⅙ the initial volume at 40° C. and 20 mm. pressure, cooled and filtered. The filter cake from the first filtration was extracted with two 300-part portions of ethylene dichloride at 40° C., filtered and the filtrates cooled whereby additional acrylamide separated. These filtrates were also concentrated and finally evaporated to dryness. The combined yield of acrylamide so obtained amounted to a conversion of 96%.

Acrylamide is prepared in accordance with this invention by passing gaseous ammonia into a solution of acrylic anhydride in an inert organic solvent. Any organic solvent liquid which is inert under the reaction conditions may be used as the medium for carrying out the reaction, but preferably it is one in which the acrylic anhydride is soluble, and more preferably is one in which the acrylamide which is produced is also soluble. Exemplary of the solvents which may be used are chlorinated hydrocarbons such as ethylene dichloride, propylene dichloride, chloroform, carbon tetrachloride, chlorobenzene, etc., hydrocarbon solvents such as toluene, hexane, etc., ethers such as diethyl ether, diisopropyl ether, dioxane, etc., and many other similar types of solvents. The amount of solvent which is used for carrying out the reaction may be varied over a wide range but should be an amount which will provide an adequate dilution. In general, the amount of solvent used should be such as to form a solution of acrylic anhydride having a concentration of about 40% or less and preferably the solution will have a concentration of from about 1 to 30% of acrylic anhydride.

The amount of gaseous ammonia passed into the acrylic anhydride solution may, of course, be varied over a wide range, but for highest yields of acrylamide is an amount equivalent to or only slightly greater than the stoichiometric amount of ammonia based on the anhydride used. Usually an amount of from about 2.0 to 2.2 moles of ammonia is added per mole of acrylic anhydride. Smaller amounts may be used but will, of course, reduce the yield. On the other hand, large excesses of ammonia should be avoided because of the production of the undesired amino propionamides which are formed when too great a concentration of ammonia is present. For the latter reason it is preferable that the ammonia be added only as fast as it reacts with the anhydride so as to avoid any appreciable excess of ammonia being present at any given time.

One of the most critical factors in carrying out the reaction in accordance with this invention is the temperature at which the reaction is carried out. In general, the temperature should be kept below about 25° C. and preferably kept within the range of about 0° C. to about 15° C. Temperatures above about 25° C. are to be avoided because such temperatures greatly reduce the yield of acrylamide by favoring the addition of ammonia to the double bond of the acrylic acid molecule whereby the undesired amino propionamides are formed.

When prepared by the process of this invention, the acrylamide is not only readily separated but is obtained in very pure form. If the inert organic solvent used as the reaction medium is a solvent for the acrylamide which is produced but not for the ammonium acrylate by-product, the latter may then be precipitated out and the acrylamide recovered from the filtrate. On the other hand, if the solvent is a solvent for both the acrylamide and the ammonium acrylate, the solvent may then be removed and the acrylamide may be obtained by extracting the residue with a solvent for the acrylamide. In any case it is possible by such means to obtain the acrylamide in a very highly pure form.

The ammonium acrylate which is obtained as a by-product is obtained in a form which is readily converted to acrylic anhydride and re-used in the process.

What I claim and desire to protect by Letters Patent is:

1. The process of preparing acrylamide which comprises passing ammonia gas through a solution of acrylic anhydride in an inert organic solvent at a temperature of from about 0° C. to about 25° C.

2. The process of preparing acrylamide which comprises passing ammonia gas through a solution of acrylic anhydride in an inert organic solvent at a rate such as to avoid the presence of any substantial excess of ammonia at any time during the reaction, with the temperature held within the range of from about 0° C. to about 25° C.

3. The process of preparing acrylamide which comprises passing ammonia gas through a solution of acrylic anhydride in an inert organic solvent at a temperature of from about 0° C. to about 15° C.

4. The process of preparing acrylamide which comprises passing ammonia gas through a solution of acrylic anhydride in ethylene dichloride at a temperature of from about 0° C. to about 25° C.

5. The process of preparing acrylamide which comprises passing ammonia gas through a solution of acrylic anhydride in ethylene dichloride at a temperature of from about 0° C. to about 15° C.

WALTER A. RACZYNSKI.

No references cited.